United States Patent
Combellas et al.

(10) Patent No.: US 9,854,104 B2
(45) Date of Patent: Dec. 26, 2017

(54) METHOD AND SYSTEM FOR DYNAMIC TRUNK GROUP BASED CALL ROUTING

(71) Applicant: Level 3 Communications, LLC, Broomfield, CO (US)

(72) Inventors: Claudia M. Combellas, Centennial, CO (US); Dana A. Johnston, Littleton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 135 days.

(21) Appl. No.: 14/944,544

(22) Filed: Nov. 18, 2015

(65) Prior Publication Data

US 2017/0142261 A1    May 18, 2017

(51) Int. Cl.
*H04M 7/12* (2006.01)
*H04L 12/64* (2006.01)
*H04L 12/803* (2013.01)

(52) U.S. Cl.
CPC ...... *H04M 7/1285* (2013.01); *H04L 12/6418* (2013.01); *H04L 47/122* (2013.01); *H04L 47/125* (2013.01)

(58) Field of Classification Search
CPC ............. H04M 7/1285; H04L 12/6418; H04L 47/122; H04L 47/125
See application file for complete search history.

(56) References Cited

U.S. PATENT DOCUMENTS

| | | | |
|---|---|---|---|
| 5,940,490 A | 8/1999 | Foster et al. | |
| 7,564,840 B2* | 7/2009 | Elliott | H04L 12/6418 370/356 |
| 8,750,884 B1 | 6/2014 | Gorman et al. | |
| 9,100,467 B2 | 8/2015 | Baldwin et al. | |
| 2005/0195741 A1* | 9/2005 | Doshi | H04L 47/825 370/230 |
| 2006/0274723 A1* | 12/2006 | Siyavudeen | H04L 12/4641 370/352 |
| 2009/0275350 A1* | 11/2009 | Poremba | H04L 12/585 455/466 |
| 2010/0157986 A1 | 6/2010 | Rao et al. | |
| 2015/0229562 A1* | 8/2015 | Jenkins | H04L 45/306 370/218 |
| 2016/0036991 A1* | 2/2016 | Brewer | H04L 65/1076 370/356 |

OTHER PUBLICATIONS

International Search Report dated Oct. 14, 2016, Int'l Appl.No. PCT/US16/045046, Int'l Filing Date Aug. 1, 2016; 3 pgs.
Written Opinion of the International Searching Authority dated Oct. 14, 2016, Int'l Appl.No. PCT/US16/045046, Int'l Filing Date Aug. 1, 2016; 5 pgs.

* cited by examiner

*Primary Examiner* — Duc C Ho

(57) ABSTRACT

Aspects of the present disclosure involve systems and methods for providing routing of a communication received at a telecommunications network based on a unique identifier. In particular, a telecommunications network may route one or more communications based on a dynamically updated trunk group identifier associated with an egress user. Thus, in addition to routing the communication based on a telephone number or Internet Protocol (IP) address associated with a user, the network may also route the communication based upon a dynamically updated trunk group identifier included in an updated routing function of the network.

20 Claims, 6 Drawing Sheets

METHOD AND SYSTEM FOR DYNAMIC TRUNK GROUP BASED CALL ROUTING

FIELD OF THE DISCLOSURE

Embodiments of the present invention generally relate to systems and methods for implementing a telecommunications network, and more specifically for providing trunk group routing for an Internet Protocol (IP)-based telecommunications network.

BACKGROUND

Telecommunication or other types of computer networks provide for the transmission of information across some distance through terrestrial, wireless or satellite communication networks. Such communications may involve voice, data or multimedia information, among others. Typically, communications transmitted through a telecommunications network is of a time-division multiplex (TDM)-type or an Internet Protocol (IP)-type communication. Thus, many telecommunication networks have both TDM-based components and IP-based components to route communications through the network. While conversion from one type of component to the other is possible, it is often that such conversions are timely and are not cost-effective for the network.

In order to transmit information from one point in the network to another, the location of the originator device (ingress user) and the terminator device (egress user) are typically tracked and maintained by the telecommunications network. This location information may be static (for stationary telecommunication devices or users) or dynamic (for mobile telecommunication devices or users). To track the location information of the users of the network, multiple methods and protocols are implemented by the network. Once the location information is available to the network (through the various tracking protocols of the network), the network may setup a communications path from the ingress location to the egress location such that information may flow between the two end users.

It is with these and other issues in mind that various aspects of the present disclosure were developed.

SUMMARY

One implementation of the present disclosure may take the form of a method for operating a telecommunications network. The method includes the operations of routing a communication over the telecommunications network to a routing engine, the communication comprising a first destination device identification associated with a customer of the telecommunications network, identifying a second destination device associated with the customer of the telecommunications network, and associating unique identifier with the communication, wherein the unique identifier specifies a dynamically updatable trunk group identifier associated with the customer of the telecommunications network. The method further includes transmitting the communication to the second destination device based at least on the unique identifier associated with the communication and routing the communication to an application server in communication with the second destination device; and wherein the application server routes the communication to the second destination device based at least on the unique identifier associated with the communication.

Another implementation of the present disclosure may take the form of a telecommunications network comprising a routing engine and an application server. The routing engine receives a communication comprising a first destination device identification associated with a customer of a telecommunications network, the first destination device comprising a time-division multiplex (TDM) component associated with the customer and the application server routes the communication to a second destination device associated with the customer based at least on a unique identifier associated with the communication, the second destination device comprising a networking Internet Protocol (IP) component and the unique identifier comprises a dynamically updatable trunk group identifier. In addition, the routing engine may associate the unique identifier with the communication when an indication of an un-connectable circuit associated with the first destination device is received and transmit the communication to the application server for processing by the application server.

Yet another implementation of the present disclosure may take the form of a routing engine component of a telecommunications network. The routing engine includes a network communication port to receive a communication over a telecommunications network, the communication comprising a first destination device identification associated with a customer of the telecommunications network, a processor, and a memory device in communication with the processor for storing one or more instructions. Further, when the instructions are executed by the processing, the routing engine performs the operations of identifying a second destination device associated with the customer of the telecommunications network, associating an unique identifier with the communication, wherein the unique identifier specifies a dynamically updatable trunk group identifier associated with the customer of the telecommunications network, and transmitting the communication to the second destination device based at least on the unique identifier associated with the communication.

DETAILED DESCRIPTION

Figure 1:
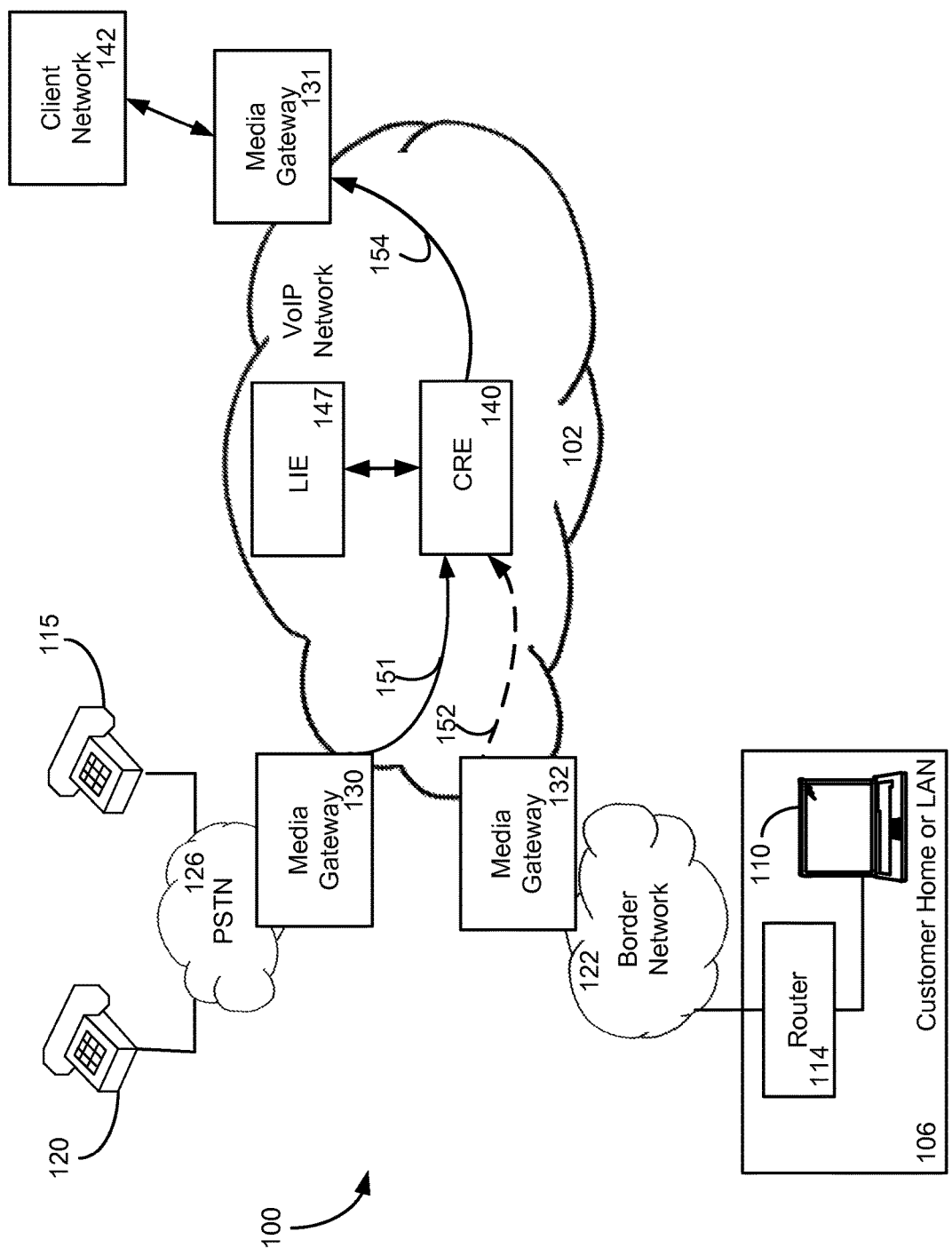
FIG. 1 is a schematic diagram illustrating an exemplary Voice over Internet Protocol (VoIP) operating environment in accordance with one embodiment.

Aspects of the present disclosure involve systems, methods, computer program products, and the like, for providing routing of a communication received at a telecommunications network based on a unique identifier. In particular, a telecommunications network may route one or more communications based on a dynamically updated trunk group identifier associated with an egress user. In general, IP-based telecommunication networks include a Location Intelligence Engine (LIE) for tracking the physical location of a user of the network in relation to the network footprint. One implementation of a telecommunications network present utilizing aspects of the present disclosure allows the location function of the network to determine or track a physical location of one or more users of the network using the unique identifier associated with the user, such as the dynamically updated trunk group identifier. The tracking function of the LIE utilizing the dynamically updated trunk group identifier may be established via static methods (such as through manual provisioning) or dynamic methods (such as through a registration process). Thus, in addition to routing the communication based on a telephone number or Internet Protocol (IP) address associated with a user, the network may also route the communication based upon a dynamically updated trunk group identifier included in an updated routing function of the network.

In one implementation of the network, a Routing Intelligence Engine (RIE) may have access to the LIE and the information maintained by the LIE. With the location information of the LIE available, the RIE determines where the ingress and egress users are located in relation to the network footprint, configures the network for communication between the ingress and egress users, and monitors the communication to take appropriate action if required. In this disclosure, the LIE may maintain location information for one or more users by associating a trunk group identifier for the user in addition to the traditional methods of location tracking, including telephone number, FQDN, etc. for the user. In addition to the changes on the information maintained by the LIE, the RIE may utilize any trunk group identifier received to determine the egress location for the communication. This combination of changes on the location and routing functions of an IP based system would allow communication to be established with traditional methods (TN, FQDN, etc.) as well as trunk group identifier methods.

The dynamically updated trunk group identifier associated with an egress user allows the network to provide overflow protection for communications routed on a trunk group identifier. For example, communications intended for a first egress connection for a customer's network may not be available to connect to the customer's network, such as when the connections to the customer's network at the first egress connection is full. Through the use of the dynamically updated trunk group identifier associated with an egress user, however, the network may route the unconnected communication to second egress connection to the customer's network to provide an overflow protection feature to communications intended for a particular trunk group associated with the customer.

In one particular implementation, the network may utilize an application server component to route communications to IP-based components or networks. The application server may be configured to scan or analyze a received communication for the dynamically updated trunk group identifier associated with an egress user and, if the dynamically updated trunk group identifier is included in the communication, the application server may associate the dynamically updated trunk group identifier with a customer destination and route the communication accordingly. In addition to providing overflow protection for a customer, the dynamically updated trunk group identifier may also be utilized to provide load balancing and other telecommunication features to customers utilizing both TDM-based components and IP-based components of the network.

FIG. 1 illustrates an exemplary operating environment 100 for providing services to customers in a telecommunications network. In general, the environment 100 provides for establishing communication sessions between network users. With specific reference to FIG. 1, the environment 100 includes a VoIP network 102, which may be provided by a wholesale network service provider. However, while the environment 100 of FIG. 1 shows a configuration using the VoIP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a user of the network will connect with the network and, more particularly, the location intelligence engine (LIE) 146 and central routing engine (CRE) 140 of the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the VoIP network 102. Such collections of may be referred to as an "enterprise network" or simply an "enterprise". In general, an enterprise network is a logical network of devices that communicate over the VoIP network 102 that may be treated by the VoIP network as a single entity. In addition, an enterprise network may include several other enterprise networks, in some embodiments. The geographic locations of the customer's networks that make up the enterprise may be as spread out as the network itself, connecting to the network in any location at which the network 102 reaches.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the portion of the customer network that connects to the network 102 through the TDM-based communication device 120, 115 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 131, and 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a user of the network 102 utilizes one or more of the communication devices to transmit a communication to the network. For example, the user may place a telephone call to the network 102 from a telephone 120 associated with the network. Upon receipt, the network 102 routes the communication 151 to a routing device 140 or routing devices integrated within the network 102. In one example, the routing devices may include a core routing engine (CRE) device 140 and/or an application server. It should be appreciated that the routing device 140 may be a part of the network 102, may be separate from the network, or may have portions deployed in the network and out of the network. In addition, routing devices 140 may be resident on one or more components of the VoIP network, including several instances of the routing devices integrated throughout the network 102. Further, although only a single instance of the routing device 140 is illustrated in FIG. 1, any number of additional routing devices may be present in the network 102.

The CRE 144 is a routing device configured to route communications through the network 102. In particular, the CRE 144 may be in communication with an LIE 147 that tracks locations of one or more users of the network and maintains a database of telephone numbers or IP addresses associated with the users of the network 102 and the destination or location of the numbers. In one particular implementation, the LIE 147 may also associate a dynamically updated trunk group identifier with one or more users of the network. Further, the LIE 147 may receive updated location information from one or more users of the network. For example, when a new user is added to the network 102, the LIE 147 may be provisioned with identifying information about the user (such as telephone number, Fully Qualified Domain Name (FQDN), etc.) and an egress location in the network for transmitting received communications to the user. This information may be updatable by the network 102 when new location information concerning a user is received or identified. In one particular implementation, a dynamically updated trunk group identifier may also be associated with a user of the network and maintained and/or updated by the LIE 147.

When a communication is received at the CRE 144, the CRE accesses the LIE 147 to determine a destination device or egress location for the communication, associates the communication with a destination device, and provides the route through the network 102 to the destination device. With this route or routing information, the communication may be transmitted through the components of the network 102 to the destination device to connect the caller with the destination device. In general, the destination device for the communication may be another component of the network 102, a media gateway associated with the network, a trunk group associated with a client to the network, or the like.

The operation of the CRE 140 is illustrated in the network 102 of FIG. 1. In particular, a communication 151, such as a telephone call, originates from a communication device 120 of a customer or customer network. The telephone call generally includes a dialed telephone number as the destination of the communication. The communication is transmitted, based on the dialed telephone number, through a PSTN 126 or border network 122 to the media gateway 130. The media gateway 130 routes the communication 151 to the CRE 140 for additional routing through the network 102 to the destination device based on location tracking information maintained by the LIE 147.

How the CRE 140 routes the communication may depend, in some network implementations, on the destination device or destination network for the communication. For example, some communications are associated with a trunk group associated with a customer of the network 102. The trunk group provides the network 102 with the destination information for the communication. Trunk group identifiers are often utilized for TDM-based networks or devices. Utilizing the example network 102 of FIG. 1, the PSTN 126 network may be accessed through a trunk group that connects the customer network 126 to the VoIP network 102. The trunk group may be associated with the customer or client of the network 102 such that communications intended for that customer include the trunk group assigned to the customer. This allows the network 102 to route communications to the customer's network or enterprise through use of the trunk group identifier. As shown in FIG. 1, the CRE 140 may route a received communication 151 to a media gateway 131 associated with the destination trunk group or network 142 based on the trunk group identifier.

Alternatively, the communication may be intended for a customer network or device that is IP-based. For those types of communications, the CRE 140 determines the destination dialed telephone number of the communication (or an IP address associated with the destination device). This destination telephone number is associated with a particular customer network or device and is routed through the network 102 to the destination. In one embodiment, the CRE 140 routes the received communication 151 to an application server. The application server determines the destination network of the communication based on the dialed telephone number or the destination IP address. Once the destination network or device is determined, the application server then routes the communication 154 to the media gateway 131 associated with the destination network 142 for connection to the destination device.

As shown above, the CRE 140 may route a received communication through the network 102 based on different information obtained from the communication. For example, the communication may be routed based on a telephone number associated with the destination, an IP address of a destination device, a FQDN of a destination device, and/or a trunk group identifier. Through the use of the location information maintained by the LIE 147, the CRE 140 determines the destination of the communication and routes the communication accordingly. In particular, FIG. 2 is a schematic diagram of a telecommunications network utilizing a dynamically updated trunk group identifier to route one or more communications.

Figure 2:
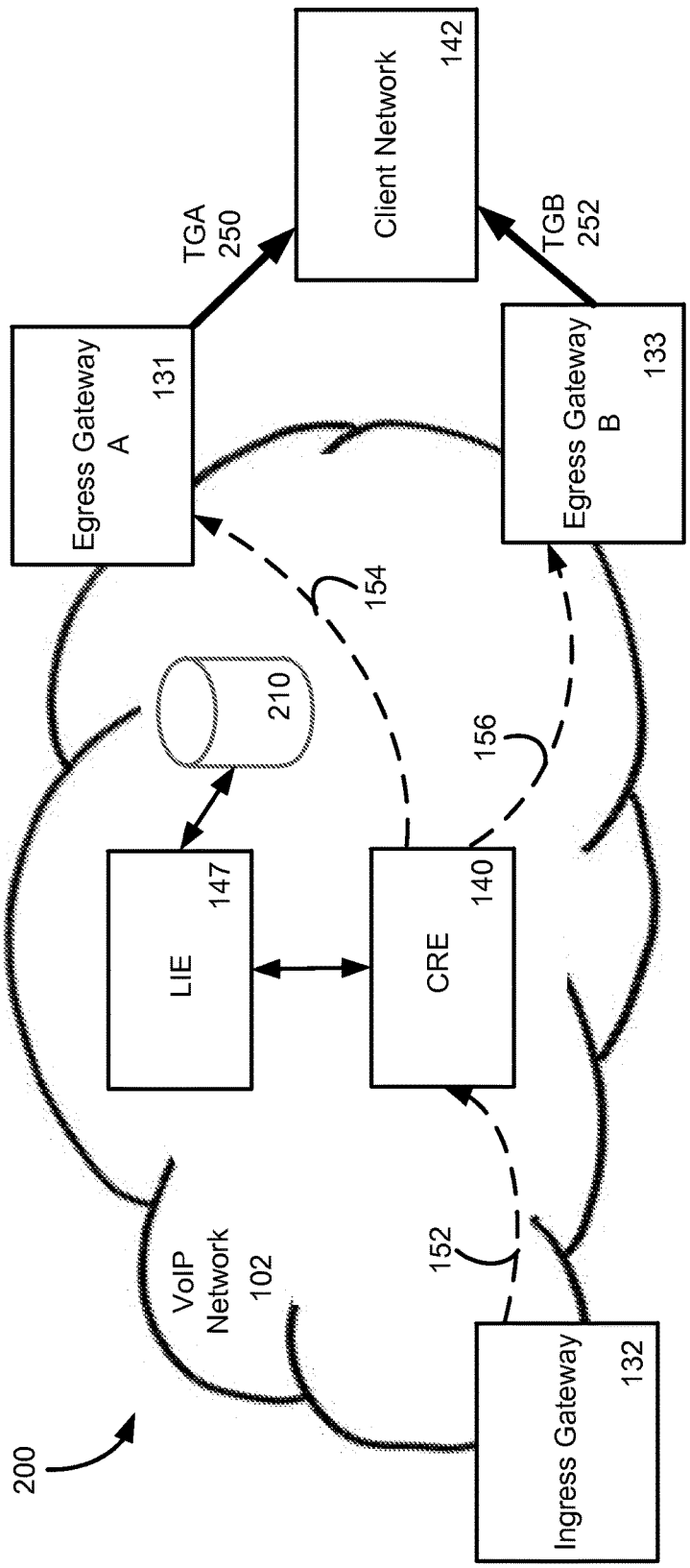
FIG. 2 is a schematic diagram of a telecommunications network utilizing a dynamically updated trunk group identifier to route one or more communications.

The system 200 of FIG. 2 is similar to the network described above with reference to FIG. 1 and includes several components described above. For example, the system 200 includes an ingress gateway 132 for receiving communications into a telecommunications network 102, a CRE 140 for routing communications, and one or more egress gateways 131, 133 for transmitting communications out of the network to a destination device. An LIE 147 similar to that described above is in communication with the CRE 140 for tracking and managing a database 210 of user identifiers and egress locations from the network 102.

As described above, a communication 152 arrives at the CRE 140 from an ingress gateway 132. The communication 152 may include some destination information, such as a telephone number, IP address, or trunk group identifier. The CRE 140 analyzes the communication 152 to determine the identifying information and accesses the LIE 147 to determine an egress gateway for the received communication. The LIE 147 maintains location information (such as a particular egress gateway from the network) associated with the identifying information in a database 210. For example, the received communication 152 may include a dialed telephone number that the LIE 147 associates with a destination device, such as an egress gateway from the network. With the destination information, the CRE 140 may route the communication to the identified destination. In one particular example, the CRE 140 may issue a Session Initiation Protocol (SIP) message to connect the communication 152 to the destination device of the network.

In one particular example, the incoming communication 152 includes a trunk group identifier. The trunk group identifier indicates a trunk group associated with a client or client network 142 through which communications may be routed. In FIG. 2, the CRE 140 receives a trunk group identifying communication 152 and, through the information received from the LIE 147, routes the communication 154 to an egress gateway (such as egress gateway A 131) based on the trunk group identifier. Typically, however, the trunk group identifier indicates a static egress gateway or other destination for the client network 142. In other words, a trunk group 250 associated with a client network 142 is a group of direct connections between the network 102 and the client network. Thus, all communications 154 based on a trunk group identifier are typically routed to the same egress gateway 131 that services the direct connection between the network and the client 142.

Some client networks 142 may be associated with more than one trunk group. For example, the client network 142 in the system 200 of FIG. 2 is accessible through trunk group A 250 (and egress gateway A 131) and trunk group B 252 (and egress gateway 133). However, trunk group A 250 and trunk group B 252 would typically have different trunk group identifiers to identify the particular trunk group. Thus, communications with a trunk group A 250 identifier would be routed by the network 102 to egress gateway A 131 and communications with a trunk group B 252 identifier would be routed by the network to egress gateway B 133, even though both communications are intended for the same client or client network 142.

In one particular implementation of the present disclosure, a communication may be routed through the network based on a dynamically updated trunk group identifier. Through the unique identifier, the communication may be routed to different destinations within the network 102 based on a trunk group identifier. Using the system 200 of FIG. 2 as an example, a received communication 152 may be routed to egress gateway A 131 based on the trunk group identifier associated with the communication. However, the trunk group identifier for a particular client may be updated through the system 200 such that a different egress gateway (such as egress gateway B 133) may become the destination for communications associated with that particular trunk group identifier. In one implementation, the destination for a trunk group identifier may be updated in the database 210 managed by the LIE 147 to point to egress gateway B 133. Thus, by updating the destination indicator for the trunk group identifier in the database 147, a received communication 152 associated with that trunk group identifier may be routed 156 to a different egress gateway 133 of the network 102. In this manner, a destination device associated with a trunk group identifier may be updated or altered within the network 102. In some cases, such updating of the destination of a trunk group identifier may occur dynamically in response to one or more measured performance criteria of the system 200, as explained in more detail below. In other cases, the LIE 147 may receive a new destination for the trunk group identifier and update the database 210 accordingly to provide the dynamically updated trunk group identifier for routing of communications through the network 102.

Figure 3:
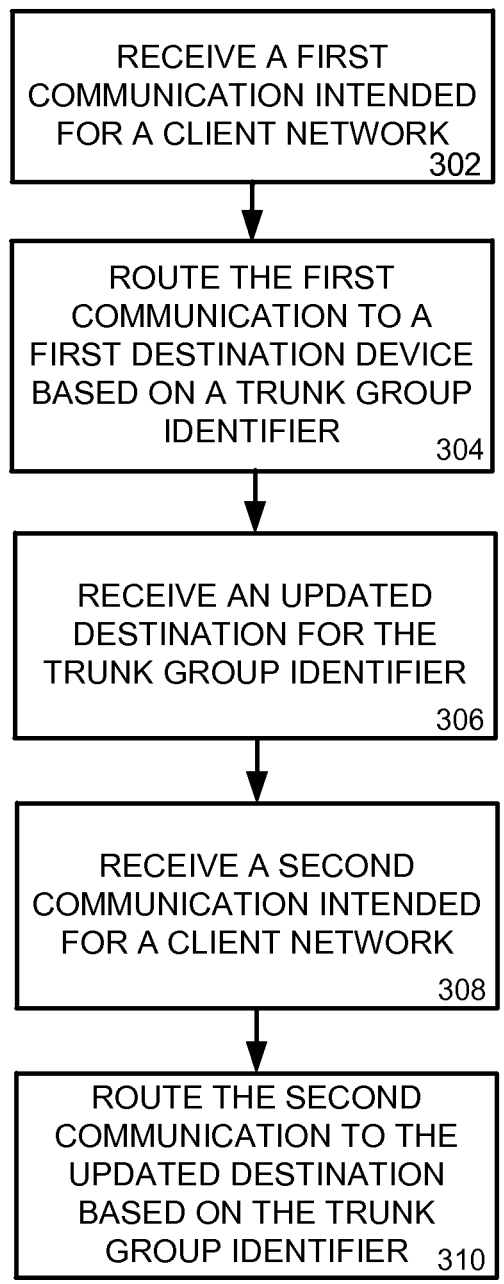
FIG. 3 is a flowchart illustrating a method for a routing engine of a telecommunications network to route received communications based on a dynamically updated trunk group identifier.

FIG. 3 is a flowchart illustrating a method for a routing engine of a telecommunications network to route received communications based on a dynamically updated trunk group identifier. In general, the operations of the method of FIG. 3 may be performed by one or more components of a telecommunications network 102. For example, the operations may be performed by the CRE 140 or LIE 147 of the network, or a combination of both components. In another example, the operations may be performed by one or more application servers of the telecommunications network.

Beginning in operation 302, the network receives a first communication intended for a client network. The first communication may include an identification of a trunk group associated with the client network. In particular, an LIE 147 associated with a telecommunications network may maintain an indication of a destination device of the network for communications including the trunk group identifier. With this information, the first communication may be routed to a first destination device of the network based on the trunk group identifier in operation 304. In one example, the destination device is an egress gateway from the network in communication with the identified trunk group.

In operation 306, the network receives an updated destination for the trunk group identifier. For example, the network may receive an identification of a different egress gateway for the trunk group identifier. Through this updated destination, communications associated with the trunk group identifier may be routed to the updated destination device. In one implementation, the network may automatically or dynamically provide the updated destination to the LIE 147 for storage in a database in response to a network condition. In another implementation, the updated destination is received from a client management device for updating the destination associated with the trunk group identifier.

In operation 308, the network receives a second communication that also includes the trunk group identifier. Similar to above, the network may then route the communication based on the associated trunk group identifier in operation 310. In this example, however, the destination device for the trunk group identifier has been updated by the system such that the communication is routed to the updated destination, such as a second egress gateway. In this manner, the network provides for routing of one or more communications based on a dynamically updated trunk group identifier.

Through the use of a dynamically updated trunk group identifier, the network 102 may provide robust and varied services to clients of the network. For example, the network 102 may provide an overflow protection for communications intended for a customer's network or enterprise. Overflow protection allows for communications that are intended for a first portion of the customer's network to be re-routed to another portion of the customer's network if the communication cannot be connected at the first portion of the network. For example, a customer may have an enterprise network located in New York City and another enterprise network located in Denver. In one implementation, the network 102 may provide an overflow feature that allows for communications intended for the New York enterprise network of the customer to be connected to the Denver enterprise network if the communication cannot be connected in New York. The communication may not be able to be connected to the enterprise in New York for various reasons, such as if all of the available circuits in the enterprise network in New York are busy, the enterprise network is not functioning, and the like. In such cases, the network 102 may then route communication for that customer to the enterprise network in Denver to provide an overflow protection to the various enterprise networks associated with that customer. Another feature provided by the network to a client or customer is a load balancing feature to balance communications to that customer between the various enterprise networks associated with the customer connected to the network 102. The dynamically updated trunk group identifier allows the network to provide such features to a client, as described in more detail below.

In addition, the dynamically updated trunk group identifier allows the network to route a communication to a client network, regardless of the type of components utilized by the network or client network. For example, many TDM-based components route communications based on a dialed telephone number, while IP-based components route based on an IP address or FQDN. If a customer of the network 102 utilizes both TDM-based network components and IP-based network components in the customer's enterprise, certain features provided by the network 102 may not be available to the customer as the components utilize different routing techniques. However, the present disclosure provides a method and/or system for providing routing of a communication received at a telecommunications network based on a unique identifier included with the communication, such as a dynamically updated trunk group identifier. By routing based on the unique identifier, a communication originally intended for a TDM-based network may be re-routed to an IP-based network by the network 102. This may aid in providing the overflow protection offered by the network 102 to the enterprise customer.

Figure 4:
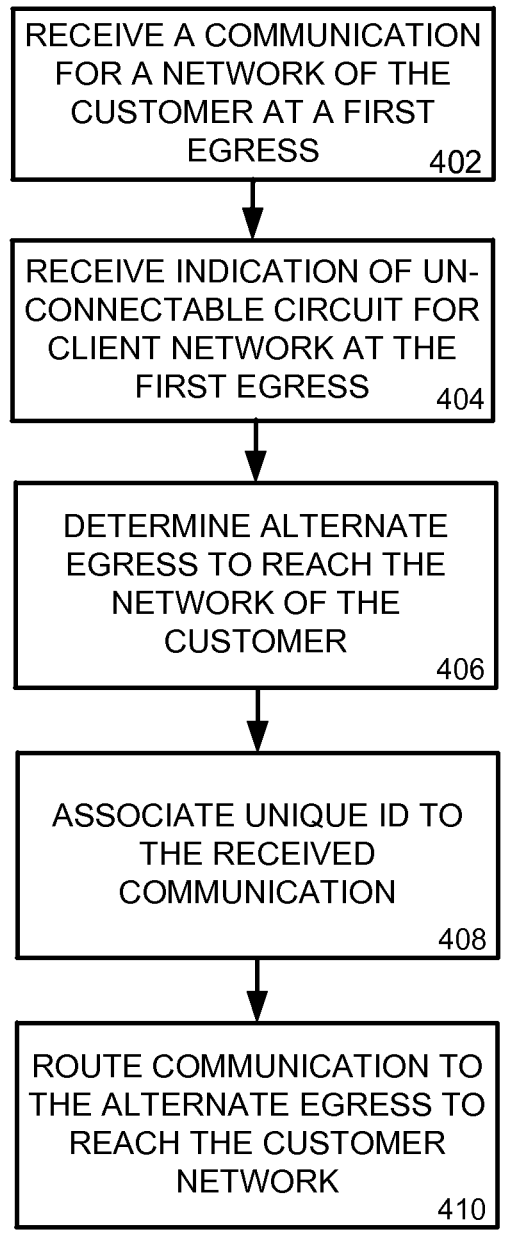
FIG. 4 is a flowchart illustrating a method for a routing engine of a telecommunications network to provide overflow protection to a client network.

FIG. 4 is a flowchart illustrating a method for a routing engine of a telecommunications network to provide overflow protection to a client network using a dynamically updated trunk group identifier. The operations of FIG. 4 may be performed by a network to provide features to customers of the network, such as trunk group overflow from one enterprise network of the customer to another enterprise network. However, it should be appreciated that the operations may be performed to route any type of communication through the network 102 based on one or more unique identifiers associated with the communication by the network. In one implementation, the operations are performed by a CRE 140 component of the network 102 for routing communications to a client network connected to the network 102. In other implementations, the operations may be performed by another component of then telecommunications network 102, a plurality of such components, or a combination of the CRE 140 and another component of the network 102. For example, the media gateway 130 and the CRE 140 may form a softswitch component of the network 102 that performs the operations of FIG. 4 discussed below. In this implementation, either the CRE 140 of the media gateway 130 performs the operations of the method.

Beginning in operation 402, the CRE 140 receives a communication intended for a customer trunk group or customer network. In one implementation, the destination customer network 142 of the communication is a TDM-based network that utilizes TDM-type communication components. For example, the customer network 142 may connect to the network 102 through one or more T1 lines. Further, the connection to the network 102 from the customer network 142 may be identified by a trunk group identifier associated with the customer. In the following example, the trunk group identifier associated with the trunk group destination of the customer is trunk group A (TGA). In other words, the network 102 utilizes TGA as the identifier for transmitting communications to that particular trunk group associated with the customer. The CRE 140 may then, upon receiving a communication intended for a device connected to the customer's network through the identified trunk group, may correlate a destination device with the trunk group identifier TGA, assign the identifier to the communication, and route the communication through the network 102 to the identified trunk group of the communication for connection to the destination device. In this manner, the communication intended for a destination device connected to the associated trunk group is routed through the network 102.

For any number of reasons, the CRE 140 may receive an indication from the destination network 142 identified by the trunk group identifier that the communication cannot be connected to the destination device in operation 404. For example, the enterprise network 142 of the customer connected through the identified trunk group may provide a busy message to the CRE 140 that the destination device is currently unreachable. In another example, the destination network 142 or device may be malfunctioning such that no new communications may be terminated at the network or device. Regardless of the reason for the communication being unconnectable to the destination network or device through the identified trunk group, the CRE 140 may recognize the state of the network or device and execute an overflow protection feature of the network. In particular, the network 102 may recognize an overflow condition of the destination network and redirect the communication to another destination network or device associated with the network customer.

To redirect the communication to another network, the CRE 140 identifies a corresponding customer network or device to route the communication in operation 406. In one particular implementation, the new destination network or device is an IP-based network associated with the customer. In one implementation, the CRE 140 utilizes a routing table stored in a database or otherwise accessible by the CRE or LIE that includes a back-up customer network or device to connect a communication when an overflow condition is determined. The back-up customer network or device listed in the routing table indicates to the CRE 140 the application server to which the communication should be routed. Thus, the CRE 140 may automatically alter the destination network associated with a particular trunk group identifier when communication with the first destination network is un-connectable.

To route the communication to the overflow network connection, the CRE 140 may associate a unique identifier (such as a dynamically updated trunk group identifier) with the communication in operation 408. In particular, the CRE 140 may generate a SIP message to route the communication to the overflow network connection associated with the destination customer network 142. Thus, in operation 410, the CRE 140 routes the communication to the overflow network associated with the customer's network 142 for connection with the customer's network.

In one particular example, the trunk group identifier associated with the communication may be trunk group B (TGB). Although TGB does not identify a particular trunk group associated with the customer, the TGB may nonetheless be used to route the communication to a customer's IP-based network 142. Further, although the TGB may be similar to other trunk group identifiers utilized by the network 102, the unique identifier may be any unique identifier that aids the application server 146 to route the communication. The routing of the communication by the CRE 140 is discussed in more detail below with reference to the method of FIG. 5.

To associate the unique identifier with the communication, the CRE 140 may embed or otherwise include the unique identifier in the SIP message. For example, a SIP request message may include a portion of the message reserved for including miscellaneous information to the receiving network component. Thus, the CRE 140, when creating the SIP request message to transmit, may insert the unique identifier into the request message field reserved for miscellaneous information. However, the unique identifier may be included in the communication in any manner, including in any field of the SIP request message.

Figure 5:
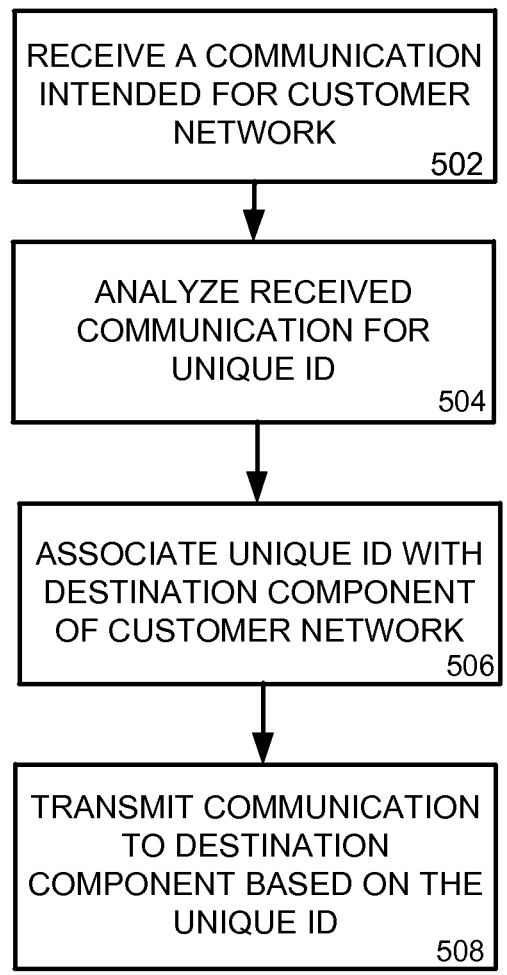
FIG. 5 is a flowchart illustrating a method for an application server of an IP-based network to route a communication based on a unique trunk group identifier.

FIG. 5 is a flowchart illustrating a method for an application server (such as a CRE 140 discussed above) of an IP-based network to route a communication based on a unique trunk group identifier included in a SIP message. Similar to the method of FIG. 4 discussed above, the operations of the method of FIG. 5 may be performed by any component of the network 102 or any combination of components of the network.

Beginning in operation 502, the application server (AS) 146 receives a communication intended for a particular customer device or network. The communication received by the AS 146 may include a unique identifier associated with the communication, as described above. In operation 504, the AS 146 analyzes the received communication to determine if the communication includes a unique identifier. For example, some communications received at the AS 146 may be for communications intended for an IP-based customer network. Thus, the communication may not include the unique identifier, rather may be routed based on the dialed telephone number or IP address of the destination device. However, in the circumstance where the communication includes a unique identifier, the AS 146 may parse through the communication to locate the unique identifier.

In operation 506, the AS 146 obtains the unique from the received communication and associates the unique identifier with a destination component of the IP-based customer network. In particular, the AS 146 utilizes a routing table or LIE that correlates telephone numbers to destination devices or networks and, in one implementation, a unique identifier with a destination device or network. In the particular example discussed above, the AS 146 obtains the identifier TGB from the received communication (such as from the SIP request message transmitted to the AS) and associates the TGB identifier with a destination network or device. As such, the routing table utilized by the AS 146 may be updated to include all unique identifiers used by the network 102 to transmit communications to IP-based networks and/or devices and the corresponding network or device.

Once correlated, the AS 146 transmits the communication to the destination IP-based network or device. Once transmitted to the customer network 142, the customer network may route the communication accordingly to terminate at a communication device. In one implementation, the routing of the communication to the customer network 142 may be accomplished utilizing SIP request and refer messages based on the correlated unique identifier and destination device or network determined from the routing table. In this manner, the network 102 may utilize a unique identifier associated with the communication to route the communication to the AS 146 and, eventually, to an IP-based network or component.

Although discussed above for use in providing an overflow feature for the network 102, the present disclosure may also be utilized to provide other network features to a customer. For example, routing a communication based on a unique identifier may be utilized to provide a load balancing feature to communications intended for a particular customer of the network 102. For this feature, the CRE 140 may receive a communication intended for a customer's enterprise network and determine which particular portion of the customer's enterprise network to route the communication. The CRE 140 may consider a load balancing aspect to the portions of the enterprise network such that no one portion is overwhelmed. When a particular egress device is selected by the CRE 140 during load balancing, the CRE may associate the communication with a unique identifier as described above. Thus, a load balancing feature of the CRE 140 may be applied such that each portion of the customer's enterprise network receives the same number of communications, or may apportion the communications to the customer's network based on a percentage assigned to each portion of the network. Through the use of the unique identifier, the network 102 may load balance across all or some available networks associated with the particular customer.

Figure 6:
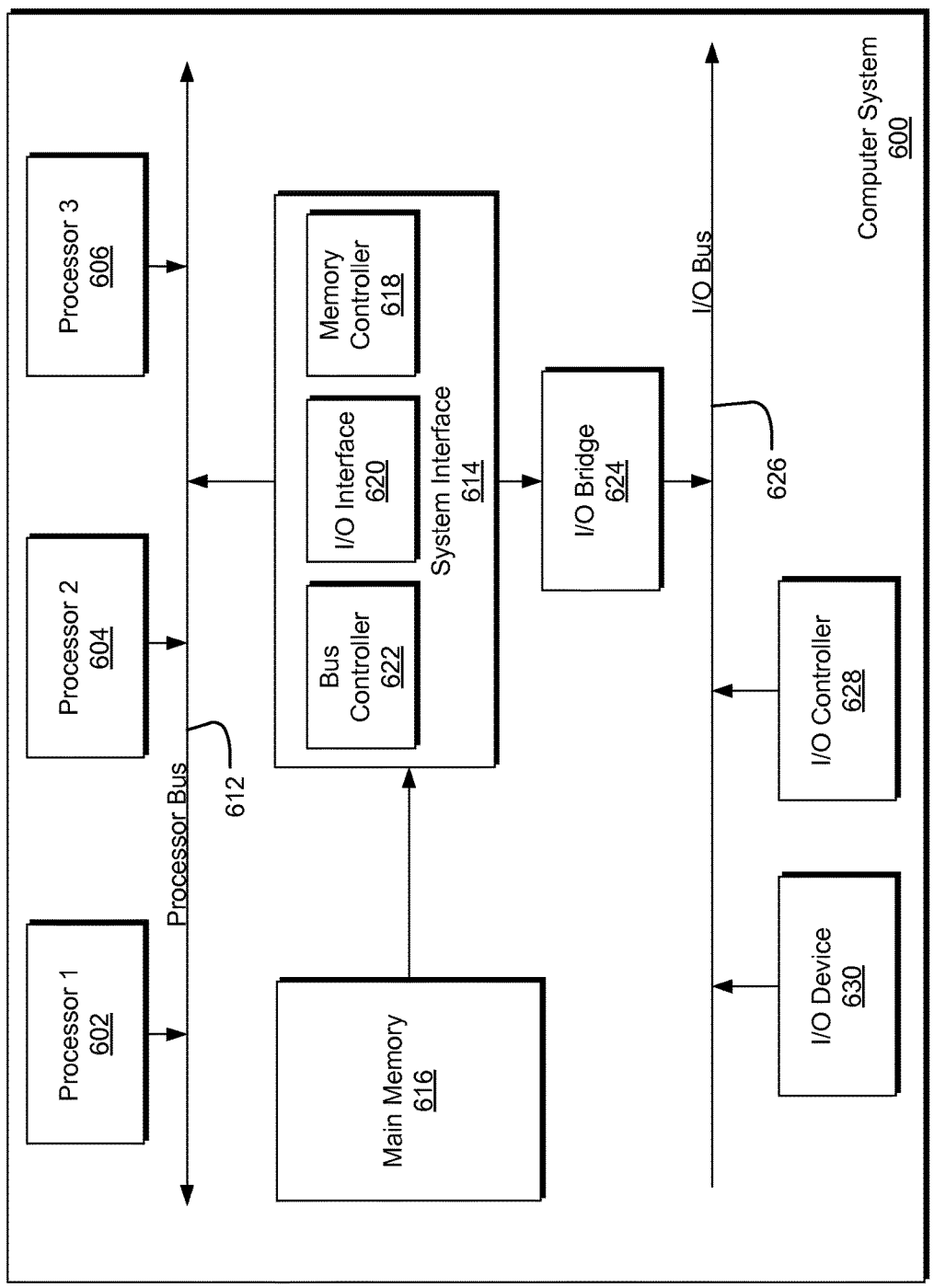
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may be used to implement the various components of the CRE 140 and/or the application server discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 614 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 640, as illustrated.

I/O device 640 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for operating a telecommunications network, the method comprising:
    receiving, by a routing engine, a communication from an ingress gateway over the telecommunications network, the communication to be routed to a first destination device associated with a customer of the telecommunications network;
    identifying, by the routing engine, a second destination device associated with the customer of the telecommunications network;
    associating, by the routing engine, a unique identifier with the communication, wherein the unique identifier specifies a dynamically updatable trunk group identifier associated with the customer of the telecommunications network, the dynamically updatable trunk group identifier indicating a trunk group associated with the second destination device; and
    routing, by an application server of the routing engine, the communication to the second destination device, wherein the application server routes the communication to the second destination device based at least on the dynamically updatable trunk group identifier specified by the unique identifier associated with the communication.

2. The method of claim 1 wherein the first destination device is a time-division multiplex (TDM) component associated with the customer of the telecommunications network.

3. The method of claim 1 wherein associating the unique identifier with the communication comprises including the unique identifier in a Session Initiation Protocol (SIP) message transmitted to the application server.

4. The method of claim 1 wherein the trunk group provides a transmission path from the ingress gateway to the second destination device associated with the customer.

5. The method of claim 4 wherein the unique identifier is a network defined trunk group identifier and the application server is configured to transmit the communication to the second destination device based at least on the network defined trunk group identifier.

6. The method of claim 1 further comprising:
    receiving an indication of an un-connectable circuit associated with the first destination device.

7. The method of claim 6 wherein the indication of the un-connectable circuit associated with the first destination device is received at the routing engine.

8. The method of claim 6 wherein identifying the second destination device comprises:
    accessing a location intelligence engine maintaining an indication of the second destination device associated with the customer.

9. The method of claim 8 wherein the second destination device is automatically identified upon receiving the indication of the un-connectable circuit associated with the first destination device.

10. A telecommunications network comprising:
    a routing engine for receiving a communication from an ingress gateway, the communication to be routed to a first destination device associated with a customer of the telecommunications network, the first destination device comprising a time-division multiplex (TDM) component associated with the customer,
    wherein the routing engine comprises an application server for routing the communication to a second destination device associated with the customer based at least on a dynamically updatable trunk group identifier specified by a unique identifier associated with the communication, the second destination device comprising a networking Internet Protocol (IP) component, the dynamically updatable trunk group identifier indicating a trunk group associated with the second destination device, and wherein the routing engine associates the unique identifier with the communication when an indication of an un-connectable circuit associated with the first destination device is received.

11. The telecommunications network of claim 10 wherein the unique identifier is associated with the communication by including the unique identifier in a Session Initiation Protocol (SIP) message transmitted to the application server.

12. The telecommunications network of claim 11 wherein the trunk group provides a transmission path from the ingress gateway to the second destination device associated with the customer.

13. The telecommunications network of claim 12 wherein the unique identifier is a network defined trunk group identifier and the application server is configured to transmit the communication to the second destination device based at least on the network defined trunk group identifier.

14. The telecommunications network of claim 10 further comprising:
a location intelligence engine in communication with the application server and maintaining an indication of the second destination device associated with the customer.

15. The telecommunications network of claim 14 wherein the location intelligence engine receives the indication of the second destination device associated with the customer and stores the indication of the second destination device in a database.

16. A routing engine of a telecommunications network, the routing engine comprising:
a network communication port to receive a communication from an ingress gateway over the telecommunications network, the communication to be routed to a first destination device associated with a customer of the telecommunications network;
a processor; and
a memory device in communication with the processor for storing one or more instructions that, when executed by the processor, cause the routing engine to:
identify a second destination device associated with the customer of the telecommunications network;
associate a unique identifier with the communication, wherein the unique identifier specifies a dynamically updatable trunk group identifier associated with the customer of the telecommunications network, the dynamically updatable trunk group identifier indicating a trunk group associated with the second destination device; and
transmit the communication to the second destination device based at least on the dynamically updatable trunk group identifier specified by the unique identifier associated with the communication.

17. The routing engine of claim 16 wherein the first destination device is a time-division multiplex (TDM) component associated with the customer of the telecommunications network.

18. The routing engine of claim 16 wherein the routing engine further comprises an application server in communication with the second destination device; and wherein the application server routes the communication to the second destination device based at least on the dynamically updatable trunk group identifier specified by the unique identifier associated with the communication.

19. The routing engine of claim 18 wherein associating the unique identifier with the communication comprises including the unique identifier in a Session Initiation Protocol (SIP) message transmitted to the application server.

20. The routing engine of claim 18 wherein the trunk group provides a transmission path from the ingress gateway to the second destination device associated with the customer.

* * * * *